US012521987B2

(12) United States Patent
Osakabe et al.

(10) Patent No.: US 12,521,987 B2
(45) Date of Patent: Jan. 13, 2026

(54) LIQUID DISCHARGE APPARATUS

(71) Applicant: BROTHER KOGYO KABUSHIKI KAISHA, Nagoya (JP)

(72) Inventors: Yoshinori Osakabe, Seto (JP); Akihiro Sakakibara, Toyota (JP); Yuta Arakawa, Nagoya (JP); Taichi Shirono, Nagoya (JP); Fumio Nakazawa, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 60 days.

(21) Appl. No.: 18/355,063

(22) Filed: Jul. 19, 2023

(65) Prior Publication Data

US 2024/0025176 A1 Jan. 25, 2024

(30) Foreign Application Priority Data

Jul. 21, 2022 (JP) ................................. 2022-116321

(51) Int. Cl.
*B41J 2/165* (2006.01)

(52) U.S. Cl.
CPC ....... *B41J 2/16511* (2013.01); *B41J 2/16508* (2013.01); *B41J 2/16523* (2013.01); *B41J 2/16547* (2013.01)

(58) Field of Classification Search
CPC B41J 2/16511; B41J 2/16505; B41J 2/16508; B41J 2/16523; B41J 2/16547
See application file for complete search history.

(56) References Cited

U.S. PATENT DOCUMENTS

| | | | | |
|---|---|---|---|---|
| 6,312,105 | B1 | 11/2001 | Miyauchi | |
| 6,793,317 | B2 * | 9/2004 | Shima .................. | B41J 2/16508 347/29 |
| 2007/0165066 | A1 | 7/2007 | Samoto et al. | |

FOREIGN PATENT DOCUMENTS

| | | | |
|---|---|---|---|
| JP | 2000127427 | A | 5/2000 |
| JP | 2007176022 | A | 7/2007 |
| JP | 2020114628 | A | 7/2020 |

* cited by examiner

*Primary Examiner* — Geoffrey S Mruk
(74) *Attorney, Agent, or Firm* — Scully, Scott, Murphy & Presser, P.C.

(57) ABSTRACT

There is provided a liquid discharge apparatus including: a head including a nozzle surface on which a nozzle is opened; a carriage holding the head and configured to move in the scanning direction; a cap configured to contact the nozzle surface to cover the nozzle in a case that the carriage is located in a first position; and a contact member. The head includes a contact part configured to make contact with the contact member. In a case that a load of a vertical component of the nozzle surface is applied to the head by the cap contacting the nozzle surface, the contact member is configured to make contact with the contact part of the head to receive the load applied to the head.

10 Claims, 8 Drawing Sheets

LIQUID DISCHARGE APPARATUS

REFERENCE TO RELATED APPLICATIONS

This application claims priority from Japanese Patent Application No. 2022-116321, filed on Jul. 21, 2022. The entire content of the priority application is incorporated herein by reference.

BACKGROUND ART

As an example of a liquid discharge apparatus configured to discharge liquid from a nozzle, an image recording apparatus including an inkjet-type recording head (a head) is known. In a known image recording apparatus, the recording head is mounted on a carriage. The carriage is slidably supported over a first guide member and a second guide member extending in a main scanning direction and can move back and forth in the main scanning direction. The recording head is mounted on the carriage with the nozzle surface with nozzles facing downward. The first guide member has a protrusion that fits into an engagement recess formed in the carriage. The engagement recess extends in a direction parallel to the nozzle surface.

In a known inkjet printer (a liquid discharge apparatus), a cap is located within the travel range of the carriage carrying the inkjet head (a head). The cap can cover the nozzle by contacting the nozzle surface on the lower surface of the inkjet head. By covering the nozzle with the cap, the drying of ink in the nozzle can be suppressed.

DESCRIPTION

When the nozzle is covered with the cap, a load from the cap is applied to the head in a direction orthogonal to the nozzle surface. In the above-known image recording apparatus, the carriage contacts the first guide member (a contact member) when a load is applied to the recording head (a head) in a direction orthogonal to the nozzle surface. More precisely, the wall surface defining the engagement recess in the carriage contacts the protrusion extending in a direction parallel to the nozzle surface formed in the first guide member. Therefore, the load applied to the head is received by the contact member via the carriage.

When the load applied to the head is received by the contact member via the carriage, stress is applied to the contact part of the carriage with the contact member and a fastening part with the head. If the carriage is irreversibly deformed by the stress, the position of the nozzle surface of the head mounted on the carriage may shift from the predetermined position. When the position of the nozzle surface changes, the size of the gap between the nozzle surface and the recording medium changes. As a result, the accuracy of image formation on the recording medium is reduced. Also, if the position of the nozzle surface changes, the reliability of the contact between the nozzle surface and the cap will decrease.

The purpose of the present disclosure is to provide a technique that contributes to suppressing the misalignment of the nozzle surface of a liquid discharge apparatus.

According to an aspect of the present disclosure, there is provided a liquid discharge apparatus including a head, a carriage, a cap and a contact member. The head includes a nozzle surface on which a nozzle is opened. The carriage holds the head and is configured to move in the scanning direction. The cap is configured to contact the nozzle surface to cover the nozzle in a case that the carriage is located in a first position. The head includes a contact part configured to make contact with the contact member. In a case that a load of a vertical component of the nozzle surface is applied to the head by the cap contacting the nozzle surface, the contact member is configured to make contact with the contact part of the head to receive the load applied to the head.

According to another aspect of the present disclosure, there is provided a liquid discharge apparatus including a head, a guide member, and a carriage. The head includes a nozzle surface on which a nozzle is opened. The guide member extends to a scanning direction. The carriage holds the head in a removable manner and is configured to move in the scanning direction while being guided by the guide member. The head is configured to make contact with the guide member, is located upstream of the guide member in a removal direction from the carriage and includes a contact part configured to face the guide member in the removal direction. The guide member includes a cutout. The contact part faces a portion in the guide member where the cutout is not formed in a case that the carriage is located in a first position and faces the cutout in a case that the carriage is located in a second position different from the first position in the scanning direction. In a case that a load of a vertical component of the nozzle surface is applied to the head and that the carriage is located in the first position, the guide member is configured to make contact with the contact part of the head to receive the load applied to the head.

According to the liquid discharge apparatus as described above, when the carriage is in the first position, the contact part of the head is in contact with the contact member, and the load applied to the head can be received by the contact member without the carriage. Therefore, deformation of the carriage can be prevented, and misalignment of the nozzle surface of the head mounted on the carriage can be suppressed.

FIG. 6A depicts the state before the recording head unit is fitted and FIG. 6B depicts the state after the front end of the recording head unit is fitted.

FIG. 7A depicts the state after the recording head unit is fitted and FIG. 7B depicts the state after the mounting is completed.

A printer 1 (corresponding to the "liquid discharge apparatus" of the present disclosure) will be described below with reference to the drawings.

<Overall Configuration of Printer 1>

Figure 1:
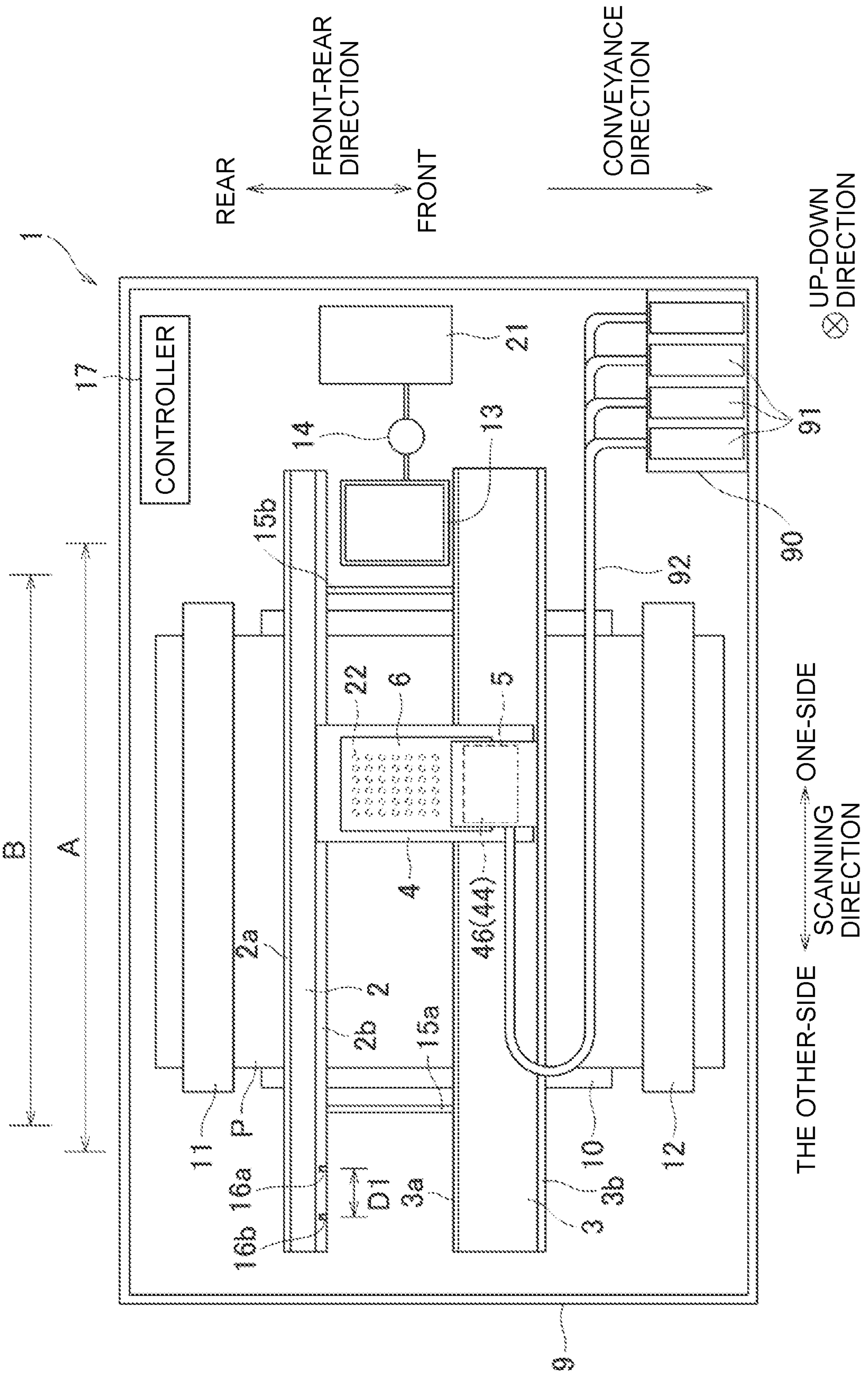
FIG. 1 is a schematic diagram of the printer.

First, the overall configuration of the printer 1 is described with reference to FIGS. 1 and 2. As depicted in FIG. 1, the printer 1 is mainly equipped with guide rails 2, 3, a carriage 4, a tube joint 5, a recording head unit 6, a paper feed roller 11, a paper discharge roller 12, a cap 13, a suction pump 14, a controller 17, and a housing 9.

The guide rails 2, 3 are made of sheet-metal materials and extend along the scanning direction. The scanning direction is horizontal and orthogonal to the front-rear direction. The two guide rails 2, 3 are apart from each other in the front-rear direction. The guide rail 2 is located more rearward than the guide rail 3. The vicinity of both ends of the guide rails 2, 3 in the scanning direction are supported by a pair of side frames 15*a*, 15*b*. The side frames 15*a*, 15*b* are attached to the housing 9. In other words, the guide rails 2, 3 are supported against housing 9 via the side frames 15*a*, 15*b*. The platen 10 is located below the two guide rails 2, 3. The platen 10, of which upper surface the recording paper P (recording medium) is placed, is located between the pair of side frames 15*a*, 15*b*.

The carriage 4 is mounted on the two guide rails 2, 3. The carriage 4 is supported from below by the two guide rails 2, 3. The carriage 4 can move in the scanning direction while being guided by the two guide rails 2, 3. The carriage 4 is attached to an unterminated drive belt (not depicted) that is wound around a pair of pulleys (not depicted). The drive belt runs when the pulleys are driven to rotate by the carriage drive motor 95 (see FIG. 2), which causes the carriage 4 to move back and forth in the scanning direction.

Tube joint 5 is attached to the carriage 4. The ends of the supply tubes 92 connected to each of the four ink cartridges 91 are connected to the tube joint 5. The four ink cartridges 91 are mounted in the cartridge mounting section 90 provided at the front end in the housing 9. The four ink cartridges 91 corresponding to four colors (black, yellow, cyan, and magenta) are mounted in the cartridge mounting section 90. The four colors of ink from each of the four ink cartridges 91 are supplied to the tube joint 5 via the supply tubes 92.

The recording head unit 6 is held on the carriage 4 in a removable manner. As will be described in detail later, the recording head unit 6 has a sub-tank 7 that can be connected to the tube joint 5, an inkjet head 8, and a case 61 that houses the sub-tanks 7 and the inkjet head 8 (see FIG. 3). The sub-tank 7 is connected to the tube joint 5. As a result, four colors of ink from the four ink cartridges 91 are supplied to each of the four intra-head flow channels 28 (see FIG. 3) of the inkjet head 8 via the tube joint 5 and the sub-tank 7.

The nozzle surface 20Y (see FIG. 3), which is the lower surface of the inkjet head 8, has a plurality of nozzles 22 (see FIG. 1) openings. The nozzle surface 20Y is a horizontal plane. When a driver IC 98 (see FIG. 2) is driven, the ink supplied to the intra-head flow channel 28 of the inkjet head 8 is ejected from the plurality of nozzles 22.

The paper feed roller 11 and the paper discharge roller 12 are driven by a conveying motor 96 (see FIG. 2), which rotates synchronously with each other. The paper feed roller 11 and the paper discharge roller 12 work together to convey the recording paper P placed on the platen 10. The conveyance direction of the recording paper P by the paper feed roller 11 and the paper discharge roller 12 is horizontal and orthogonal to the scanning direction and is from backward to forward. The paper feed roller 11 and the paper discharge roller 12 correspond to the "conveyor" of the present disclosure.

The cap 13 is located on one side of the scanning direction than the side frame 15*b*, which is located on one side of the scanning direction among the pair of side frames 15*a*, 15*b*. The cap 13 faces the nozzle surface 20Y of the inkjet head 8 in the up-down direction when the carriage 4 is moved to the standby position (corresponding to the "first position" in the present disclosure) on one side of the scanning direction than the side frame 15*b*. The cap 13 is driven by the elevation motor 97 (see FIG. 2) and can be raised and lowered in the up-down direction. The cap 13 can take a capping position (the position depicted in FIG. 3), which is in contact with the nozzle surface 20Y of the inkjet head 8, and an uncapped position, which is lower than the capping position and separated from the nozzle surface 20Y. The cap 13 is formed primarily of an elastic material such as rubber. The cap 13 consists of a flat floor portion and an annular lip portion located on the outer edge of the floor portion. With the carriage 4 in the standby position, when the cap 13 is raised from the detached position to the capping position by the elevation motor 97, the upper-end of the lip portion of the cap 13 is in close contact with the nozzle surface 20Y. As a result, the plurality of nozzles 22 are covered by the cap 13. In the printer 1, when the printer is in standby mode without printing, the carriage 4 is in the standby position and the plurality of nozzles 22 are covered by the cap 13. This prevents the ink in the nozzles 22 from drying.

The suction pump 14 is a tube pump or similar device and is connected to the cap 13 and the waste tank 21. The suction pump 14 can be driven while the multiple nozzles 22 are covered by the cap 13. This allows a so-called suction purge to be performed. In the suction purge, the ink discharged by the suction purge, in which the ink in the inkjet head 8 and air, etc. mixed in the sub-tank 7 are discharged from the plurality of nozzles 22, is transferred to the waste liquid tank 21.

Figure 2:
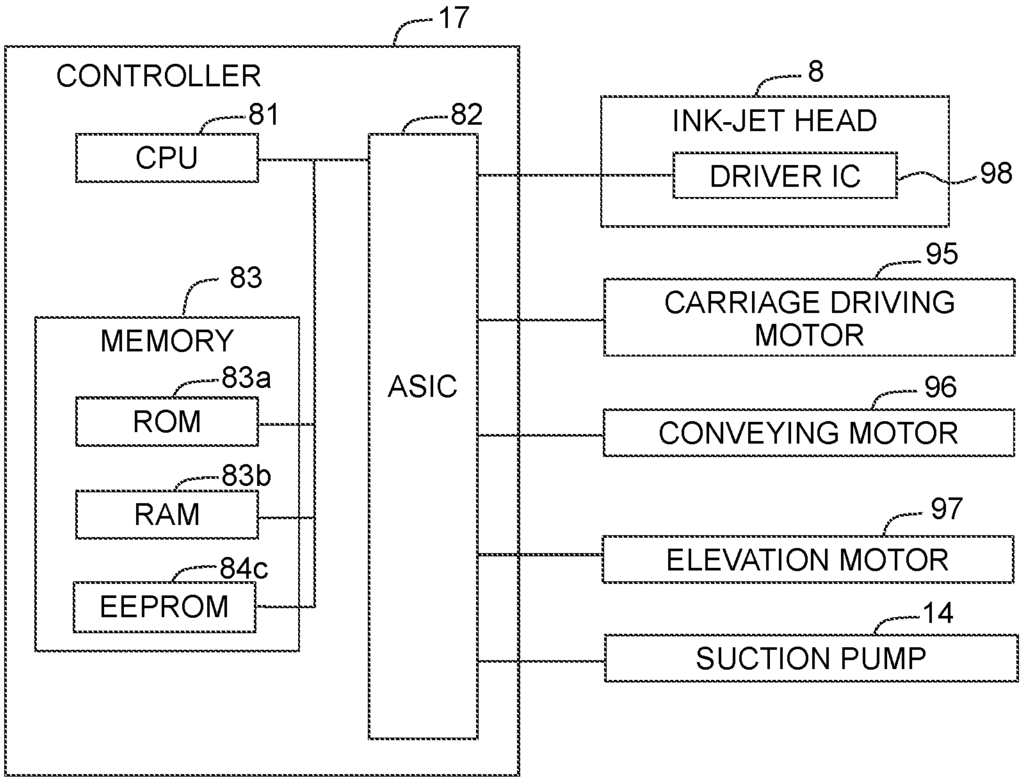
FIG. 2 is a block diagram depicting the electrical configuration of the printer.

As depicted in FIG. 2, the controller 17 includes a CPU 81 (Central Processing Unit), an ASIC 82 (Application Specific Integrated Circuit) and a memory 83. The CPU 81, ASIC 82 and memory 83 are connected by an internal bus. The memory 83 is connected by an internal bus. The memory 83 includes ROM 83*a* (Read Only Memory), RAM 83*b* (Random Access Memory), and EEPROM 83*c* (Electrically Erasable Programmable Read-Only Memory), CPU 81 executes the program while using RAM 83*b* and EEPROM 83*c*. The ASIC 82 is electrically connected to the driver IC 98 of the inkjet head 8, the carriage driving motor 95, the conveying motor 96, the elevation motor 97, and the suction pump 14. The ASIC 82 outputs control signals to the driver IC 98, the carriage driving motor 95, the conveying motor 96, the elevation motor 97, and the suction pump 14 to control their operation.

The controller 17 controls the driver IC 98, the carriage driving motor 95, and the conveying motor 96 based on the recording data transmitted from an external device (e.g., PC or smartphone). As a result, the controller 17 causes the inkjet head 8 to alternately perform the conveyance operation and the recording operation to record an image on the recording paper P. Specifically, in the conveyance operation, the controller 17 controls the conveying motor 96 to convey the recording paper P by the paper feed roller 11 and the paper discharge roller 12 in the conveyance direction. In the recording operation, the controller 17 controls the driver IC 98 and the carriage driving motor 95 to eject ink from nozzle 22 while moving the inkjet head 8 together with the carriage 4 in the scanning direction.

The range A depicted in FIG. 1 is the range of movement of the carriage 4 with respect to the scanning direction in the recording operation. The carriage 4 moves from one side of the platen 10 to the other side with respect to the scanning direction in the recording operation. The range B depicted in FIG. 1 is the facing range where the nozzle surface 20Y faces the platen 10. More precisely, when the carriage 4 is positioned within the range B, at least a part of the nozzle surface 20Y faces the platen 10. The range A includes the entirety of the range B. In the recording operation, the controller 17 moves the carriage 4 back and forth in range A and causes ink to be ejected from the nozzles 22 of the inkjet head 8 when the carriage 4 passes through the range B inside the range A.

Figure 3:
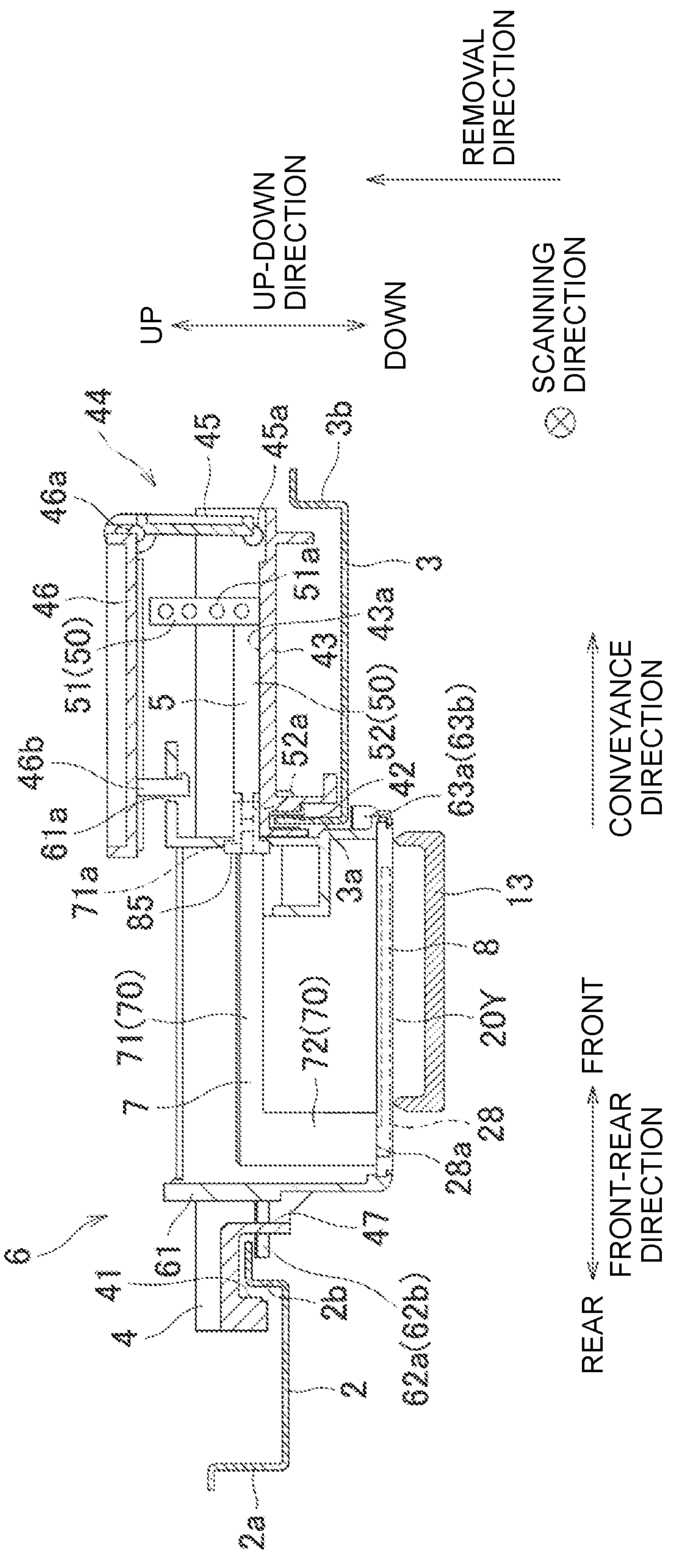
FIG. 3 depicts a cross-sectional view of the recording head unit with the nozzle surface capped and the guide rail and the carriage in a plane perpendicular to the scanning direction.
Figure 4:
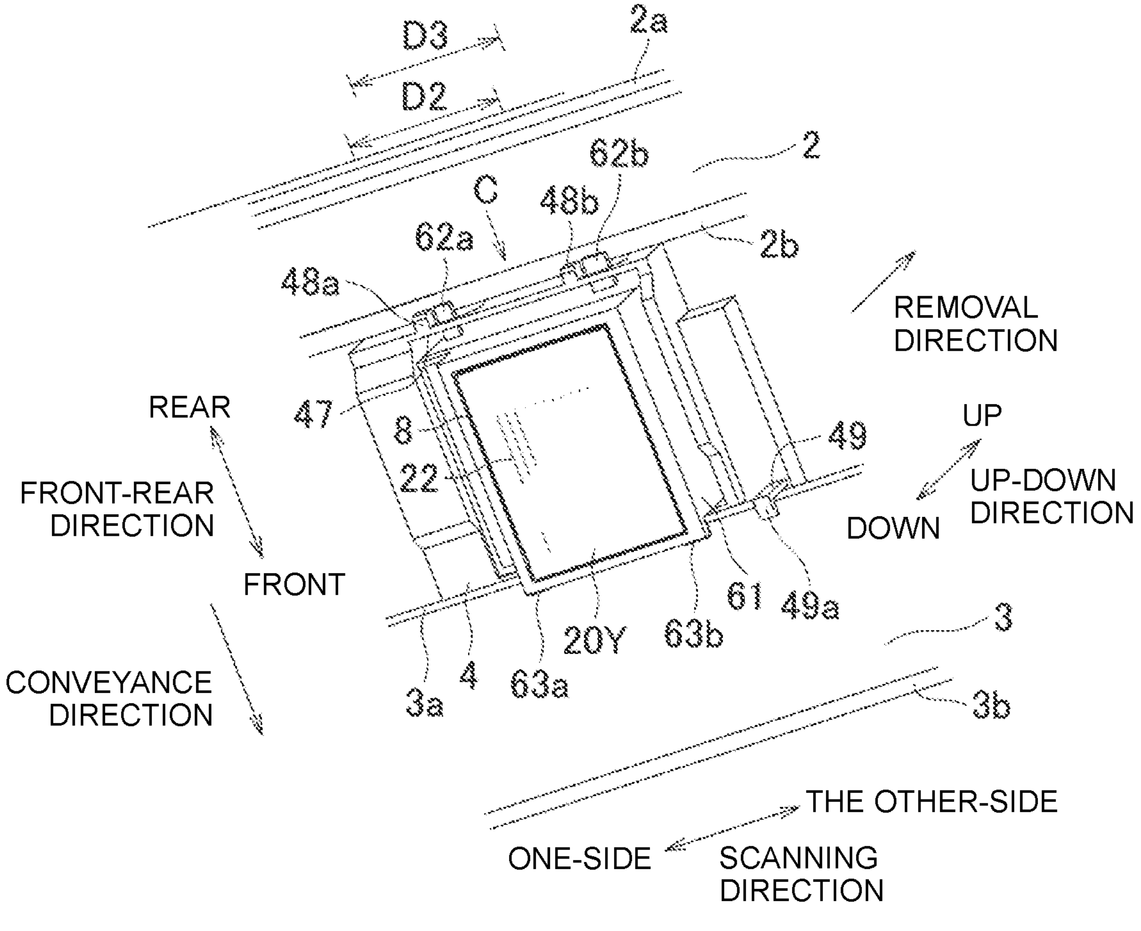
FIG. 4 is a diagonal downward view of the carriage.

The configuration of the guide rails 2, 3, the carriage 4, the tube joint 5, and the recording head unit 6 will then be explained with further reference to FIGS. 3 to 5.

<Composition of Guide Rails 2, 3>

As depicted in FIG. 3, the guide rail 2, which is made of sheet-metal material, has its thickness direction roughly parallel to the up-down direction. Both ends of the guide rail 2 in the front-rear direction are provided with curved portions 2*a* and 2*b*, which are bent upward. The upper-end of the curved portion 2*b* at the forward end of the guide rail 2 is bent forward. In other words, the curved portion 2*b* includes a portion extending in the up-down direction and a portion extending in the front-rear direction. Similarly, the guide rail 3, which is made of sheet-metal material, has its thickness direction roughly parallel to the up-down direction. Both ends of the guide rail 3 in the front-rear direction are provided with curved portions 3*a* and 3*b* which are bent upward.

As depicted in FIG. 1, cutouts 16*a* and 16*b* are formed near the other end of the guide rail 2 in the scanning direction. The cutouts 16*a* and 16*b* are formed in the curved portion 2*b* of the guide rail 2 that extends in the front-rear direction. The front side of the cutouts 16*a* and 16*b* is open. The separation distance between the two cutouts 16*a* and 16*b* with respect to the scanning direction is distance D1.

The cutouts 16*a*, 16*b* are located on the outside of the pair of side frames 15*a*, 15*b*. In detail, the cutouts 16*a*, 16*b* are located on the other side of the scanning direction than the side frame 15*a*, which is located on the other side of the scanning direction among the pair of side frames 15*a*, 15*b*. The cutouts 16*a* and 16*b* are located outside the range A, which is the range of movement of the carriage 4 with respect to the scanning direction in the recording operation. In other words, the location of the cutouts 16*a* and 16*b* is also outside the range B, which is the facing range where at least a part of the nozzle surface 20Y faces the platen 10. More precisely, the cutouts 16*a* and 16*b* are located on the other side than the other end of the scanning direction in the range A.

<Configuration of Carriage 4>

As depicted in FIG. 3, a groove 41 is formed at the rear end of the carriage 4, wherein the groove 41 is opened downward and extends along the scanning direction. The curved portion 2*b* of the guide rail 2 is fitted into the groove 41. In addition, a groove 42, which is opened downward and extends along the scanning direction, is formed in the forward portion of the carriage 4 from the portion where the groove 41 is formed. The curved portion 3*a* provided at the rear end of the guide rail 3 is fitted into the groove 42.

An opening 47 penetrating in the up-down direction is formed between the portion of the carriage 4 where groove 41 is formed and the portion where groove 42 is formed in the front-rear direction. In other words, the opening 47 of the carriage 4 is located between the two guide rails 2, 3 with respect to the front-rear direction. The recording head unit 6 is fitted into the opening 47. A direction of removal (a removal direction), from the carriage 4, of the recording head unit 6 fitted into the opening 47 is from downward to upward.

The forward end of the carriage 4 is an overlap portion 43, which overlaps the guide rail 3 in the up-down direction. The overlap portion 43 is located above the guide rail 3. The overlap portion 43 has an upwardly facing and horizontally extending surface 43*a*. The tube joint 5 is attached to the surface 43*a* of the overlap portion 43 in the carriage 4.

A lever 44 is provided at the forward end of the overlap portion 43 of the carriage 4. The lever 44 has a first member 45 and a second member 46. The first member 45 is rotatable about a shaft 45*a* extending along a direction parallel to the scanning direction. The shaft 45*a* of the first member 45 is attached to the overlap portion 43. The first member 45 extends along a direction of extension parallel to a plane orthogonal to the scanning direction (hereinafter referred to as the "orthogonal plane"), with the portion where the shaft 45*a* is provided as one-end portion. The second member 46 is rotatable around a shaft 46*a* extending along a direction parallel to the scanning direction. The shaft 46*a* of the second member 46 is attached to the other end of the first member 45 opposite to the one-end where the shaft 45*a* is provided in the first member 45 with respect to the direction of extension of the first member 45 that extends parallel to the orthogonal plane. The second member 46 extends along the direction of extension parallel to the orthogonal plane, with the shaft 46*a* being provided at one-end.

The second member 46 is provided with an engaging part 46*b*. The engaging part 46*b* is provided near the other end of the second member 46 opposite to the one-end where the shaft 46*a* is provided, with respect to the extension direction of the second member 46 extending in a direction parallel to the orthogonal plane. The engaging part 46*b* can engage an opening 61*a* provided in the case 61 of the recording head unit 6. The opening 61*a* penetrates in the up-down direction. The opening 61*a* is located above the overlap portion 43 of the carriage 4 and opposite the rear end of the overlap portion 43 vertically.

The lever 44 can take a first position (see FIG. 2 and FIG. 7B) and a second position (see FIGS. 6A, 6B and 7A) by being operated by the user. When the lever 44 is in the first position, the extension of the first member 45 in the orthogonal plane orthogonal to the scanning direction is in the up-down direction and the extension of the second member 46 is in the front-rear direction. When the lever 44 is in the first position, the second member 46 is above the overlap portion 43 of the carriage 4 and is vertically opposite to the overlap portion 43. When the lever 44 is in the first position, the engaging part 46*b* on the second member 46 of the lever 44 protrudes downwardly from the lower surface of the second member 46. When the lever 44 is in the first position, the engaging part 46*b* engages the opening 61*a* in the case 61 of the recording head unit 6 that is fitted into the opening 47 of the carriage 4.

When the vicinity of the engaging part 46*b* in the lever 44 in the first position is lifted upward by the user, the opening 61*a* and the engaging part 46*b* are disengaged. When the lever 44 is further pulled forward by the user, the lever 44 is positioned in the second position (see FIGS. 6A, 6B and 7A). When the lever 44 is in the second position, the other end of the first member 45 in the extending direction is located more forward than the one-end in the extending direction (the part attached to the overlap portion 43). The extending direction is parallel to the orthogonal plane orthogonal to the scanning direction. The shaft 46*a* of the second member 46 is attached to the other end of the first member 45 in the extending direction. One-end of the first member 45 in the extending direction is attached to the overlap portion 43. When the position of the lever 44 changes between the first and second positions, the first member 45 moves between an upright position and an oblique position. In the upright position, the extension of the first member 45 in the orthogonal plane is in the up-down direction. In the oblique position, the other end of the first member 45 in the extending direction is more forward than the one-end in the extending direction.

The tube joint 5 attached to the overlap portion 43 of the carriage 4 slides in the front-rear direction in conjunction with the first member 45 of the lever 44 moving between the upright and oblique positions by means of an interlocking mechanism (not depicted). Specifically, when the first member 45 of the lever 44 moves from the oblique position to the upright position, i.e., when the lever 44 moves from the second position to the first position, the tube joint 5 slides from forward to backward. This allows the tube joint 5 to be connected to the sub-tank 7. When the first member 45 of the lever 44 moves from the upright position to the oblique position, i.e., when the lever 44 moves from the first position to the second position, the tube joint 5 slides from backward to forward. This allows the connection between the tube joint 5 and the sub-tank 7 to be disconnected.

The carriage 4 is provided with claw portions 48*a*, 48*b* and a hook portion 49 to prevent the carriage 4 from exiting the guide rails 2, 3, as depicted in FIG. 4. The claw portions 48*a*, 48*b* and a curved portion 49*a* described below of the hook portion 49 correspond to the "carriage-side facing portion" of the present disclosure.

The claw portions 48*a*, 48*b* protrude rearwardly from the rear lateral wall in the carriage 4. The claw portions 48*a*, 48*b* are located apart in the scanning direction. The claw portions 48*a*, 48*b* are located below the curved portion 2*b* of the guide rail 2 (upstream of the removal direction). The claw portions 48*a*, 48*b* face the curved portion 2*b* of the guide rail 2 with respect to the up-down direction (removal direction).

The hook 49 protrudes downward from the lower lateral wall of the carriage 4 and has its lower-end bent forward as a curved portion 49*a*. The curved portion 49*a* of the hook 49 is located on the lower side of the guide rail 3 (upstream of the removal direction). The curved portion 49*a* of the hook 49 faces the guide rail 3 in the up-down direction (removal direction).

Figure 5A:
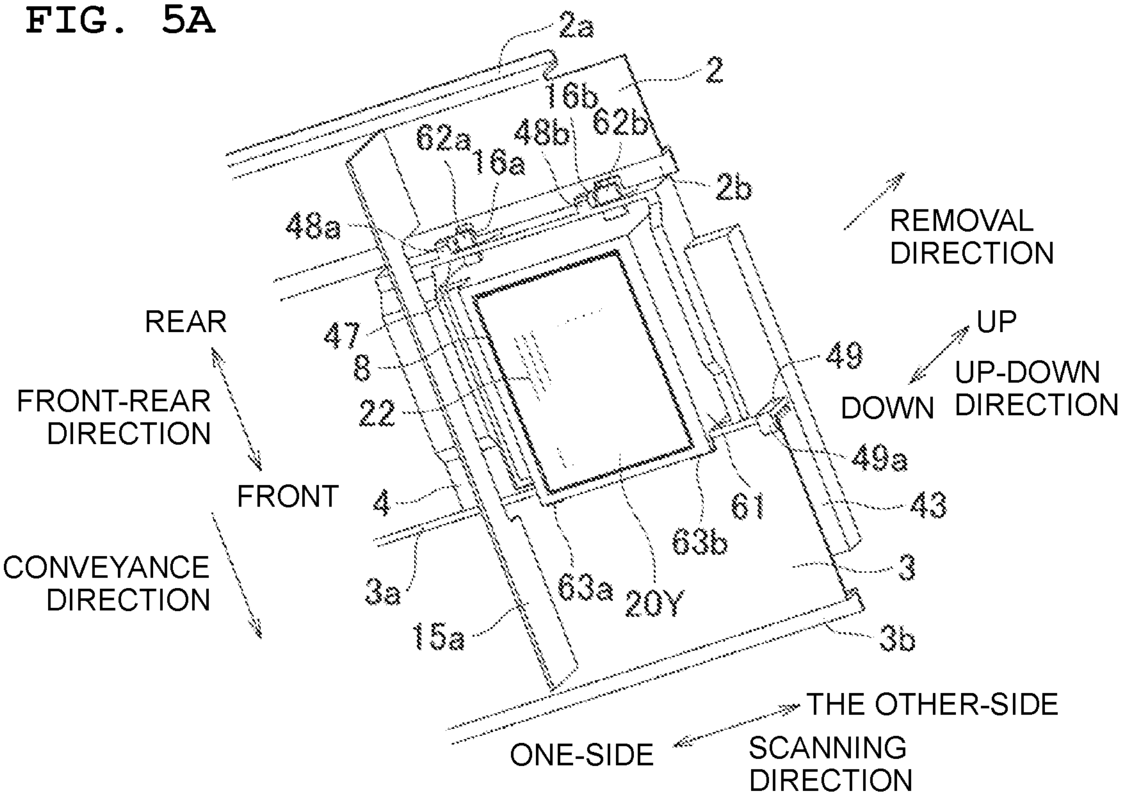
FIGS. 5A and 5B are oblique downward views of the carriage, FIG. 5A depicting the unit insertion position and FIG. 5B depicting the carriage insertion position.
Figure 5B:
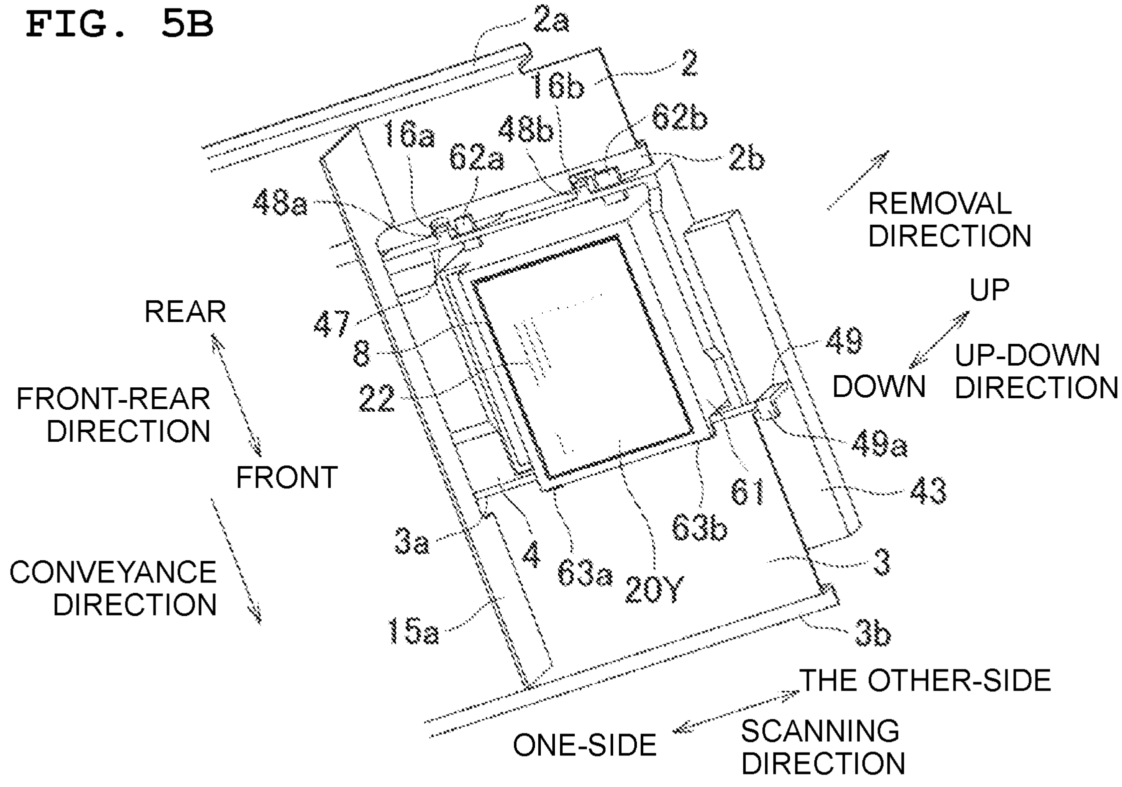

The distance D2, which is the separation distance with respect to the scanning direction between the two claw portions 48*a*, 48*b*, is approximately equal to the distance D1, which is the separation distance with respect to the scanning direction between the two cutouts 16*a*, 16*b*. Therefore, as depicted in FIG. 5B, the two claw portions 48*a* and 48*b* on the carriage 4 can be located in the carriage removal position opposite to areas where the two cutouts 16*a* and 16*b* are formed in the guide rail 2, respectively. When the carriage 4 is in the carriage removal position, the claw portions 48*a*, 48*b* can pass through the cutouts 16*a*, 16*b*. Therefore, the claw portions 48*a*, 48*b* can be pulled out from below the guide rail 2 to above the guide rail 2 through the cutouts 16*a*, 16*b*. When the carriage 4 is in the carriage removal position, the hook 49 is located on the other side of the guide rail 3 than the other end in the scanning direction. In other words, at this time, the curved portion 49*a* of the hook 49 does not face the guide rail 3 with respect to the up-down direction. Therefore, the carriage 4 can be pulled upwardly from the guide rails 2, 3 when the carriage 4 is in the carriage removal position.

When the carriage 4 is not in the carriage removal position, the claw portions 48*a* and 48*b* contact the curved portions 2*b* of the guide rail 2 and the curved portion 49*a* of the hook portion 49 contacts the guide rail 3 when the carriage 4 is lifted upward. This prevents the carriage 4 from exiting the guide rails 2, 3.

<Composition of Tube Joint 5>

As depicted in FIG. 3, the tube joint 5 has a portion extending along the up-down direction and a portion extending rearward from the lower-end of the portion extending along the up-down direction. The tube joint 5 is attached to the carriage 4 so that the lower surface of the portion extending along the front-rear direction faces the surface 43*a* of the overlap portion 43.

A cartridge-side connecting portion 51*a* is provided on the wall on one side of the scanning direction in the portion of the tube joint 5 that extends along the up-down direction. The cartridge-side connecting portion 51*a* is connected to the end of the supply tube 92 connected to the ink cartridge 91. Four cartridge-side connecting portions 51*a* are provided in a row along the up-down direction. The four cartridge-side connecting portions 51*a* correspond to four colors: black, yellow, cyan, and magenta.

A head-side connecting portion 52*a* is provided on the rear lateral wall of the portion of the tube joint 5 that extends along the front-rear direction. The head-side connecting portion 52*a* is connected to the sub-tank 7 which constitutes the recording head unit 6. Four head-side connecting portions 52*a* are provided in a row along the scanning direction. The four head-side connecting portions 52*a* correspond to the four colors: black, yellow, cyan, and magenta.

Four ink channels (not depicted) are formed in the tube joint 5. The ink is supplied to the four ink channels from the supply tubes 92 connected to the four cartridge-side connecting portions 51*a*, respectively. The ink in the ink channels of the tube joint 5 is then supplied to the ink channels (not depicted) formed in the sub-tank 7 connected to the head-side connecting portion 52*a*.

<Configuration of Recording Head Unit 6>

The configuration of the recording head unit 6 is described next. As depicted in FIG. 3, the recording head unit 6 has the sub-tank 7, the inkjet head 8, and the case 61 that houses the sub-tanks 7 and the inkjet head 8.

As depicted in FIG. 3, the sub-tank 7 has a portion extending along the front-rear direction and a portion extending downward from the rear end of the portion extending along the front-rear direction. The front lateral wall of the portion extending along the front-rear direction of the sub-tank 7 is provided with four connecting portions 71*a*. The four connecting portions 71*a* are aligned along the scanning direction. A rubber connecting member 85 is attached to the connecting portions 71*a*. The four connecting portions 71*a* are connected to the four head-side connecting portions 52*a* on the tube joint 5 respectively via the connecting member 85.

Four ink channels (not depicted) are formed in the sub-tank 7. Ink is supplied to the four ink channels respectively from the four ink channels (not depicted) formed in the tube joint 5, which is connected to the sub-tank 7 via the connecting member 85.

The lower-end of the portion extending along the up-down direction in the sub-tank 7 is located on the upper surface of the inkjet head 8. The four ink channels formed in the sub-tank 7 are each opening at the lower-end of the portion extending along the up-down direction in the sub-tank 7. Ink in the four ink channels of the sub-tank 7 is supplied to each of the four intra-head flow channels 28 formed in the inkjet head 8 via ink supply ports 28*a* formed on the upper surface of the inkjet head 8.

Four intra-head flow channels 28 are formed in the inkjet head 8, each containing a plurality of nozzles 22 (see FIG. 1). The lower surface of the inkjet head 8 is the nozzle surface 20Y, on which the plurality of nozzles 22 is formed. On the upper surface of the inkjet head 8, the four ink supply ports 28*a* are formed to supply ink to each of the four intra-head flow channels 28. As described above, the four ink supply ports 28*a* are connected to the ends of the four ink channels formed in the sub-tank 7, respectively.

When the head-side connecting portion 52*a* in the tube joint 5 is connected to the connecting portion 71*a* in the sub-tank 7, the ink supplied from the ink cartridge 91 via the supply tube 92 to the ink channel (not depicted) in the tube joint 5 is sent to the ink channel formed in the sub-tank 7 (not depicted) to the intra-head flow channel 28 of the inkjet head 8.

As depicted in FIG. 3, the recording head unit 6 include the sub-tank 7 and inkjet head 8 in the case 61 with the inkjet head 8 located below the sub-tank 7.

The case 61 has four claw portions 62*a*, 62*b*, 63*a*, 63*b*, as depicted in FIGS. 3 and 4. The claw portions 62*a* and 62*b* can contact the guide rail 2. The claw portions 63*a* and 63*b* can contact the guide rail 3. The claw portions 62*a*, 62*b*, 63*a*, 63*b* correspond to the "contact part" of the present disclosure.

The claw portions 62*a* and 62*b* protrude rearwardly from the rear sidewall of the case 61. The two claw portions 62*a* and 62*b* are separated from each other in the scanning direction. The claw portions 62*a* and 62*b* are located below the curved portion 2*b* of the guide rail 2 (upstream of the removal direction). The claw portions 62*a* and 62*b* are opposite the curved portions 2*b* of the guide rail 2 with respect to the up-down direction (in the removal direction).

The claw portions 63*a*, 63*b* protrude forward from the front lateral wall of the case 61. The two claw portions 63*a*, 63*b* are separated from each other in the scanning direction. The claw portions 63*a* and 63*b* are located on the lower side of the guide rail 3 (upstream of the removal direction). The claw portions 63*a* and 63*b* face the guide rail 3 with respect to the up-down direction (in the removal direction).

The distance D3, which is the separation distance between the two claw portions 62*a*, 62*b* with respect to the scanning direction, is approximately equal to the distance D1, which is the separation distance between the two cutouts 16*a*, 16*b* with respect to the scanning direction. Therefore, as depicted in FIG. 5*a*, the carriage 4 can be located in the unit removal position (corresponding to the "second position" of the present disclosure) where the two claw portions 62*a* and 62*b* on the case 61 of the recording head unit 6 face the locations where the two cutouts 16*a* and 16*b* are formed in the guide rail 2, respectively. When the carriage 4 is in the unit removal position, the claw portions 62*a* and 62*b* can pass through the cutouts 16*a* and 16*b*. Therefore, the claw portions 62*a*, 62*b* can be pulled out from below the guide rail 2 to above the guide rail 2 through the cutouts 16*a*, 16*b*.

When the carriage 4 is not in the unit removal position, the claw portions 62*a* and 62*b* face the curved portions 2*b* of guide rail 2 and the claw portions 63*a*, 63*b* face the guide rail 3. Therefore, when the carriage 4 is in the standby position facing the cap 13, the cap 13 contacts the nozzle surface 20Y. As a result, when a load of the vertical component (upward component) of the nozzle surface 20Y is applied to the recording head unit 6, the claw portions 62*a* and 62*b* contact the curved portion 2*b* of the guide rail 2, and the claw portions 63*a* and 63*b* contact the guide rail 3. At this time, the guide rails 2, 3 are in contact with the claw portions 62*a*, 62*b*, 63*a*, 63*b* and receive the load applied to the recording head unit 6.

Of the pair of claw portions 62*a* and 62*b*, the claw portion 62*a* located on one side of the scanning direction is located on the other side of the scanning direction than the claw portion 48*a* located on one side of the scanning direction of the pair of claw portions 48*a* and 48*b* formed on the carriage 4. The claw portion 62*b*, which is located on the other side of the scanning direction among the pair of claw portions 62*a*, 62*b*, is located on the other side of the scanning direction than the claw portion 48*b*, which is located on the other side of the scanning direction among the pair of claw portions 48*a*, 48*b* formed on the carriage 4. The claw portions 63*a* and 63*b* are located on one side of the scanning direction than the hook section 49 formed on the carriage 4.

As depicted in FIG. 4, the center position with respect to the scanning direction in the recording head unit 6 is position C. At this time, the claw portion 48*a* is located on the opposite side of position C from claw portion 62*a* with respect to the scanning direction. The claw portion 48*b* is located between the claw portion 62*b* and the position C in the scanning direction.

<Mounting Procedure for Recording Head Unit 6>

Next, with further reference to FIGS. 6 and 7, the procedure for attaching the recording head unit 6 to the carriage 4 is explained.

Figure 6A:
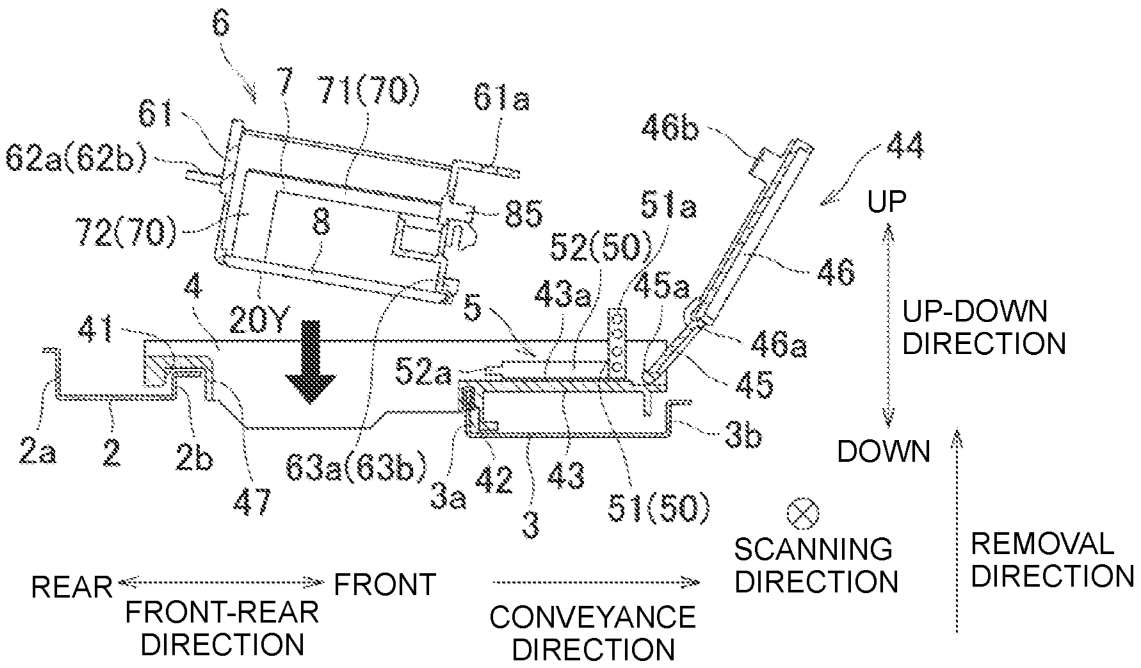
FIGS. 6A and 6B depict the procedure for mounting the recording head unit to the carriage.

First, as depicted in FIG. 6A, the recording head unit 6 is fitted into the opening 47 of the carriage 4 in the unit removal position from above downward. The recording head unit 6 is tilted so that the rear end of the nozzle surface 20Y is higher than the front end. At this time, the lever 44 of the carriage 4 is in the second position.

Figure 6B:
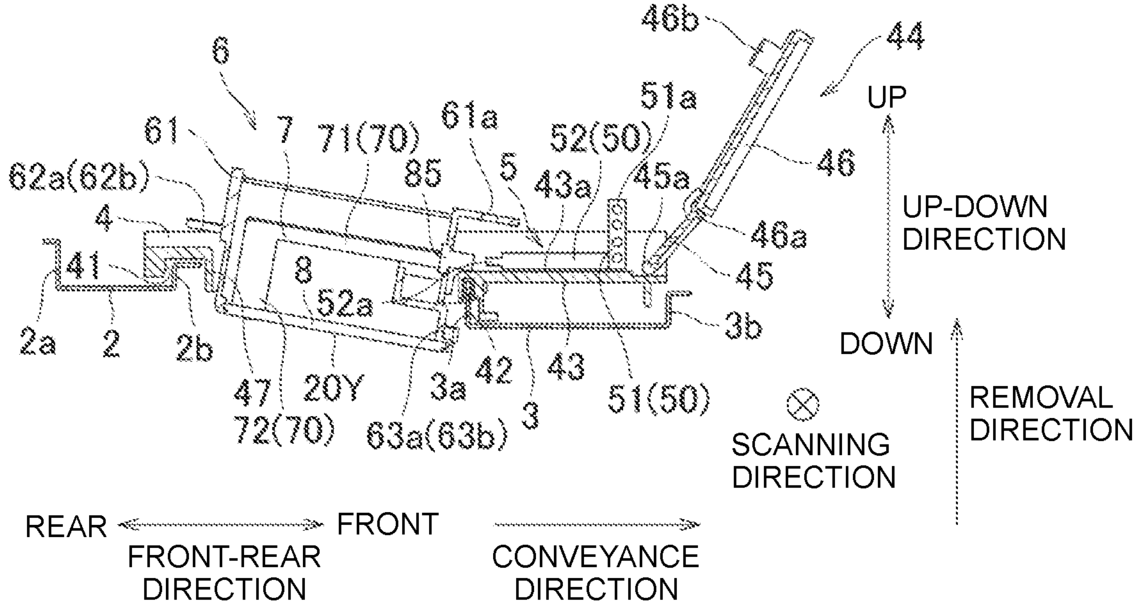
Figure 7A:
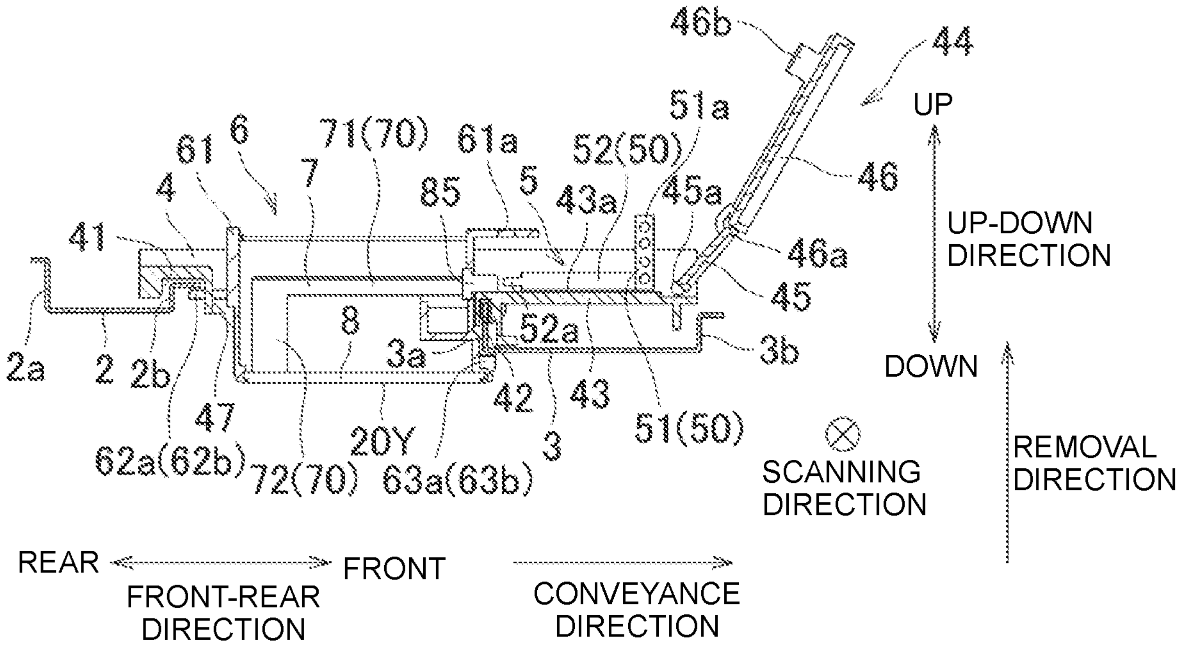
FIGS. 7A and 7B depict the procedure for mounting the recording head unit to the carriage.

As depicted in FIG. 6B, after fitting the recording head unit 6 until the claw portions 63*a* and 63*b* formed on the front lateral wall in the case 61 of the recording head unit 6 are below the guide rail 3, the recording head unit 6 is placed in a position where the nozzle surface 20Y is horizontal, as depicted in FIG. 7A. At this time, the claw portions 62*a* and 62*b* formed on the rear lateral wall in the case 61 of the recording head unit 6 enter the curved portion 2*b* of the guide rail 2 from above and below through the cutouts 16*a* and 16*b* formed in the curved portion 2*b* of the guide rail 2.

As depicted in FIG. 7A, when the recording head unit 6 is fitted into the opening 47 of the carriage 4, the connecting portion 71*a* of the sub-tank 7 to which the connecting member 85 is attached is located on the face 43*a* of the overlap portion 43 of the carriage 4. At this time, the connecting portion 71*a* of the sub-tank 7 faces the four head-side connecting portions 52*a* of the tube joint 5, respectively, with respect to the front-rear direction. The connecting portions 71*a* of the sub-tank 7 are located rearwardly of the head-side connecting portions 52*a* of the tube joint 5.

Figure 7B:
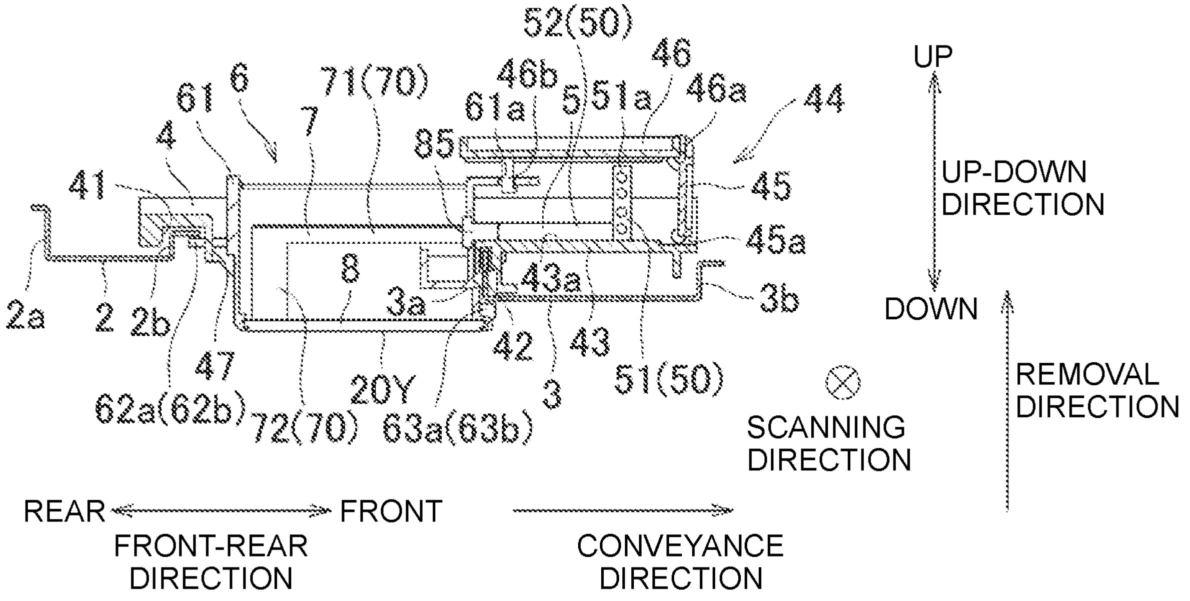

Then, as depicted in FIG. 7B, the lever 44 is moved from the second position to the first position, and the engaging part 46*b* of the lever 44 is engaged with the opening 61*a* in the case 61 of the recording head unit 6. At this time, the tube joint 5 slides from the front side to the rear side as the lever 44 moves from the second position to the first position. As a result, the four head-side connecting portions 52*a* of the tube joint 5 and the four connecting portions 71*a* of the sub-tank 7 are connected respectively via the connecting member 85. In other words, the tube joint 5 and the sub-tank 7 are connected via the connecting member 85.

To remove the recording head unit 6 from the carriage 4, the carriage 4 is located in the unit removal position. Then, the opening 61*a* in the case 61 of the recording head unit 6 and the engaging part 46*b* of the lever 44 are disengaged, and the lever 44 is moved from the first position to the second position. As the lever 44 moves from the first position to the second position, the tube joint 5 slides from the rear side to the front side. This allows the connection between the tube joint 5 and the sub-tank 7 to be disconnected.

The recording head unit 6 is then tilted so that the rear end of the nozzle surface 20Y is higher than the front end. At this time, the claw portions 62*a* and 62*b* are pulled out from below the guide rail 2 to above the guide rail 2 through the cutouts 16*a* and 16*b*. The recording head unit 6 is then lifted upward from below and pulled out from the opening 47 of the carriage 4. At this time, as depicted in FIG. 5A, the claw portions 48*a*, 48*b* and the hook 49 formed on the carriage 4 are positioned opposite the guide rails 2, 3. Therefore, the claw portions 48*a*, 48*b* and the hook 49 are in contact with the guide rails 2, 3 to prevent the carriage 4 from coming off the guide rails 2, 3 together with the recording head unit 6.

<Technical Features of the Embodiment>

As described above, the printer 1 includes the carriage 4 configured to move back and forth in the scanning direction, and the cap 13 that can cover the nozzle 22 in contact with the nozzle surface 20Y of the recording head unit 6 mounted on the carriage 4 when the carriage 4 is in the standby position. The recording head unit 6 includes the claw portions 62*a*, 62*b*, 63*a*, 63*b* that can contact the guide rails 2, 3. When a load of the vertical component of the nozzle surface 20Y is applied to the recording head unit 6 by the cap 13 contacting the nozzle surface 20Y, the guide rails 2, 3 contact the claw portions 62*a*, 62*b*, 63*a*, 63*b* of the recording head unit 6 to receive the load applied to the recording head unit 6.

The above configuration allows the claw portions 62*a*, 62*b*, 63*a*, 63*b* of the recording head unit 6 to contact the guide rails 2, 3 when the carriage 4 is in the standby position, and the load applied to the recording head unit 6 is received by the guide rails 2, 3 without the carriage 4. Therefore, deformation of the carriage 4 can be prevented and misalignment of the nozzle surface 20Y of the recording head unit 6 mounted on the carriage 4 can be suppressed.

In the printer 1 of the embodiment described above, the carriage 4 holds the recording head unit 6 in a removable manner. The claw portions 62*a*, 62*b*, 63*a*, 63*b* of the recording head unit 6 are located upstream of the guide rails 2, 3 with respect to the removal direction of the recording head unit 6 from the carriage 4 and can face the guide rails 2, 3 with respect to the removal direction. The cutouts 16*a* and 16*b* are formed in the guide rail 2, which are opposite the claw portions 62*a* and 62*b* of the recording head unit 6 with respect to the removal direction when the carriage 4 is in the unit removal position, which is different from the standby position with respect to the scanning direction. Therefore, when the carriage 4 is in the unit removal position, the claw portions 62*a* and 62*b* of the recording head unit 6 can pass through the cutouts 16*a* and 16*b* of the guide rail 2. Thus, the recording head unit 6 can be attached to and detached from the carriage 4. Also, for example, the rigidity of the guide rail 2 can be increased compared to the case where the cutouts that allow the claw portions 62*a*, 62*b* to pass through are formed throughout the guide rail 2, including the locations facing the claw portions 62*a*, 62*b* of the recording head unit 6 when the carriage 4 is in the standby position.

In addition, in the printer 1 of the embodiment described above, the load applied to the recording head unit 6 can be received by the guide rails 2, 3, which are members that guide the carriage 4.

Furthermore, in the printer 1 of the embodiment described above, the cutouts 16*a*, 16*b* of the guide rail 2 are located outside the range B, which is the facing range where at least a part of the nozzle surface 20Y faces the platen 10. When the carriage 4 moving while being guided by the guide rails 2, 3 passes through the portion of the guide rail 2 where the cutouts 16*a* and 16*b* are formed, the recording head unit 6 may tilt. In this configuration, the carriage 4 does not pass through the portion where the cutouts 16*a* and 16*b* are formed when the carriage 4 is moving within the range B where at least part of the nozzle surface 20Y faces the platen 10 while being guided by the guide rails 2, 3. Therefore, the recording head unit 6 can be suppressed from tilting and disrupting the formed image when ink is being discharged onto the recording paper P supported by the platen 10.

In the printer 1 of the embodiment described above, the cutouts 16*a* and 16*b* of the guide rail 2 are located outside the range A, which is the range of movement of the carriage 4 in the scanning direction in the recording operation. Therefore, when the carriage 4 is moving within the range A while being guided by the guide rails 2, 3 during the recording operation, it does not pass through the portion where the cutouts 16*a* and 16*b* are formed. Therefore, it is possible to suppress the tilting of the recording head unit 6 during the recording operation, which disturbs the formed image.

Furthermore, the printer 1 in the embodiment described above has a pair of side frames 15*a*, 15*b* that support the guide rails 2, 3 near both ends in the scanning direction, respectively. The cutouts 16*a*, 16*b* of the guide rail 2 are located outside of the pair of side frames 15*a*, 15*b* with respect to the scanning direction. Therefore, the strength of the guide rail 2 can be reduced compared to the case where the cutouts 16*a*, 16*b* are located inside the pair of side frames 15*a*, 15*b* with respect to the scanning direction.

In addition, the printer 1 of the embodiment described above has the carriage 4 located upstream of the guide rails 2, 3 with respect to the removal direction, and has claw portions 48*a*, 48*b* and hook portion 49 facing the guide rails 2, 3 with respect to the removal direction when the carriage 4 is in the unit removal position. Therefore, when the recording head unit 6 is removed from the carriage 4 and when the carriage 4 is in the unit removal position, the claw portions 48*a*, 48*b* and the hook portions 49 are in contact with the guide rails 2, 3 to prevent the carriage 4 from being removed from the guide rails 2, 3 together with the recording head unit 6.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The above embodiment describes a case in which the printer 1 is equipped with a cap 13 that can cover the nozzle 22 in contact with the nozzle surface 20Y. The present disclosure is not limited to such a configuration. The printer 1 may not be provided with the cap 13. When the carriage 4 is in the first position, the claw portions 62*a* and 62*b* of the recording head unit 6 may face the portion of the guide rail 2 in which the cutouts 16*a* and 16*b* are not formed. Furthermore, when the carriage 4 is in the second position, which is different from the first position with respect to the scanning direction, the claw portions 62*a*, 62*b* of the recording head unit 6 may face the cutouts 16*a*, 16*b* in the guide rail 2. In this configuration, when the load of the vertical component of the nozzle surface 20Y is applied to the recording head unit 6 when the carriage 4 is in the first position, the guide rail 2 contacts the claw portions 62*a* and 62*b* of the recording head unit 6 to receive the load applied to the recording head unit 6. Therefore, deformation of the carriage 4 can be reduced and misalignment of the nozzle surface 20Y of the recording head unit 6 mounted on the carriage 4 can be suppressed. In addition, when the carriage 4 is in the first position, the recording head unit 6 cannot be attached to or detached from the carriage 4, thus preventing user mishandling.

Figure 8:
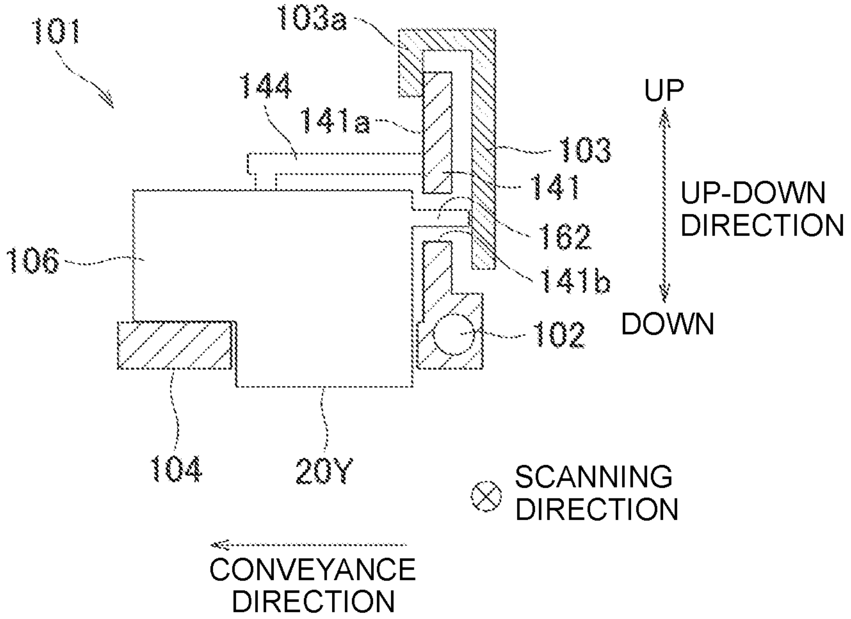
FIG. 8 depicts the printer.

The above embodiment describes a case in which the claw portions 62*a*, 62*b*, 63*a*, 63*b* formed on the recording head unit 6 are capable of contacting the guide rails 2, 3 that support the carriage 4 from below. However, the present disclosure is not limited to such a configuration. For example, in the printer 101 depicted in FIG. 8, the carriage 104 is supported while being penetrated by the guide shaft 102 extending along the scanning direction. The carriage 104 can move back and forth in the scanning direction while being guided by the guide shaft 102. The guide shaft 102 supports the lower-end of the lateral wall 141 on the upstream side in the conveyance direction in the carriage 104. A lock lever 144 is attached to the lateral wall 141 of the carriage 104 to secure the recording head unit 106 mounted on the carriage 104.

A guide rail 103 extending along the scanning direction is located upstream of the carriage 104 in the transport direction. The guide rail 103 is a plate-like member extending in the up-down direction, and its upper-end is provided with a curved portion 103*a* that is bent downstream in the transport direction. The tip of the curved portion 103*a* contacts the upper-end portion of the downstream-facing surface 141*a* of the lateral wall 141 of the carriage 4. The curved portion 103*a* supports the surface 141*a* of the lateral wall 141 in the carriage 4. This prevents the carriage 4 from rotating counterclockwise in FIG. 8 around the guide shaft 102 due to gravity.

The lateral wall on the upstream side of the recording head unit 106 is provided with a projection 162 protruding from the upstream side in the conveyance direction. The projection 162 projects from the downstream side to the upstream side of the lateral wall 141 with respect to the conveyance direction through an opening 141*b* formed in the lateral wall 141 of the carriage 104. The tip of the projection 162 can contact the guide rail 103. In the printer 101, when a load of the vertical component of the nozzle surface 20Y is applied to the recording head unit 106, the guide rail 103 contacts the projection 162 of the recording head unit 106 to receive the load applied to the recording head unit 106.

The members that the claw portions 62*a*, 62*b*, 63*a*, 63*b* formed on the recording head unit 6 come into contact with are not limited to members for guiding the carriage 4. For example, when a load is applied to the recording head unit 6, a member may be provided as a dedicated member that contacts a part of the recording head unit 6 and receives the load applied to the recording head unit 6.

In addition, the above embodiment describes a case in which the recording head unit 6 has two claw portions 62*a* and 62*b* that can contact the guide rail 2 and two claw portions 63*a* and 63*b* that can contact the guide rail 3. However, the present disclosure is not limited to such a configuration. The recording head unit 6 need only be provided with at least one contacting portion capable of contacting either the guide rail 2 or the guide rail 3.

Furthermore, the above embodiment describes a case in which cutouts 16*a* and 16*b* are formed in the guide rail 2 through which the claw portions 62*a* and 62*b* of the recording head unit 6 can pass, but cutouts 16*a* and 16*b* may not be formed in the guide rail 2.

In the embodiment described above, the case is described where the unit removal position is near the end of the other side of the guide rails 2, 3 in the scanning direction. However, the present disclosure is not limited to such a configuration. The unit removal position can be any position different from the standby position.

In addition, the above embodiment describes a case in which the cutouts 16*a* and 16*b* of the guide rail 2 are located outside of the range A, the range of movement of the carriage 4 in the recording operation. However, the present disclosure is not limited to such a configuration. For example, the location of the cutouts 16*a* and 16*b* may be inside the range A and outside the range B, which is the facing range where at least a part of the nozzle surface 20Y faces the platen 10. The location of the cutouts 16*a* and 16*b* may be inside the range B.

In the embodiment described above, the cutouts 16*a* and 16*b* are located outside of the pair of side frames 15*a*, 15*b* with respect to the scanning direction. However, the present disclosure is not limited to such a configuration. The cutouts 16*a*, 16*b* may be located inside the pair of side frames 15*a*, 15*b*.

In addition, the above embodiment describes a case in which the carriage 4 is provided with the claw portions 48*a*, 48*b* and the hook 49 to prevent the carriage 4 from exiting the guide rails 2, 3. However, the present disclosure is not limited to such a configuration. These claw portions 48*a*, 48*b* and the hook 49 may be omitted.

Furthermore, the above embodiment describes a case in which the recording head unit 6 is removable from the carriage 4. However, the present disclosure is not limited to such a configuration. The recording head unit 6 may not be removable from the carriage 4.

This disclosure may be applied not only to printers equipped with heads that eject ink, but also to devices equipped with heads that eject liquids other than ink in general.

What is claimed is:

1. A liquid discharge apparatus comprising:

a head including a nozzle surface on which a nozzle is opened;

a carriage holding the head and configured to move in a scanning direction;

a cap configured to contact the nozzle surface to cover the nozzle in a case that the carriage is located in a first position; and a contact member separated from the cap, wherein the head includes a contact part configured to make contact with the contact member, in a case that a load of a vertical component of the nozzle surface is applied to the head by the cap contacting the nozzle surface, the contact member is configured to make contact with the contact part of the head to receive the load applied to the head.

2. A liquid discharge apparatus comprising:

a head including a nozzle surface on which a nozzle is opened;

a carriage holding the head and configured to move in the scanning direction;

a cap configured to contact the nozzle surface to cover the nozzle in a case that the carriage is located in a first position; and a contact member, wherein the head includes a contact part configured to make contact with the contact member, in a case that a load of a vertical component of the nozzle surface is applied to the head by the cap contacting the nozzle surface, the contact member is configured to make contact with the contact part of the head to receive the load applied to the head; wherein the head is configured to be removable from the carriage in a removal direction, the contact part of the head is located upstream of the contact member in the removal direction, and is configured to face the contact member in the removal direction, the contact member includes a cutout formed at a position opposite to the contact part of the head in the removal direction in a case that the carriage is located in a second position different from the first position in the scanning direction.

3. The liquid discharge apparatus according to claim 2, wherein the contact member is a guide member extending in the scanning direction and configured to guide the carriage in the scanning direction.

4. The liquid discharge apparatus according to claim 3, wherein, the guide member is a frame configured to support the carriage from below.

5. The liquid discharge apparatus according to claim 4, further comprising a pair of side frames configured to support both ends of the frame in the scanning direction, respectively, wherein the cutout is located outside of the pair of side frames in the scanning direction.

6. The liquid discharge apparatus according to claim 4, wherein the carriage is located upstream from the frame in the removal direction and includes a carriage-side facing portion configured to face the frame in the removal direction in a case that the carriage is located in the second position.

7. The liquid discharge apparatus according to claim 6, wherein the carriage-side facing portion is located, in the scanning direction, between the contact part and a center position of the head in the scanning direction.

8. The liquid discharge apparatus according to claim 6, wherein the carriage-side facing portion is located, in the scanning direction, opposite a center position of the head in the scanning direction across the contact part of the head.

9. The liquid discharge apparatus according to claim 3, further comprising:

a conveyor configured to convey a recording medium in a conveyance direction; and a platen configured to support the recording medium conveyed by the conveyor, wherein a travel range of the carriage in the scanning direction includes a facing range in which at least a part of the nozzle surface faces the platen, and the cutout is located outside of the facing range in the scanning direction.

10. The liquid discharge apparatus according to claim 3, further comprising a controller configured to execute a recording operation in which a liquid is ejected from the nozzle toward a recording medium while the carriage is reciprocated within a travel range in the scanning direction, wherein the cutout is located outside of the travel range in the scanning direction.

* * * * *